(12) United States Patent
Barrett et al.

(10) Patent No.: US 8,005,100 B2
(45) Date of Patent: Aug. 23, 2011

(54) NETWORK FOR CONFINED HAZARDOUS OR OTHER EXTREME ENVIRONMENTS

(75) Inventors: Steve Barrett, Hamilton (CA); Andy Stein, Cookstown (CA)

(73) Assignee: Active Control Technology Inc., Burlington, Ontario (CA)

( * ) Notice: Subject to any disclaimer, the term of this patent is extended or adjusted under 35 U.S.C. 154(b) by 270 days.

(21) Appl. No.: 11/649,419

(22) Filed: Jan. 4, 2007

(65) Prior Publication Data

US 2008/0076383 A1 Mar. 27, 2008

Related U.S. Application Data

(60) Provisional application No. 60/826,456, filed on Sep. 21, 2006.

(51) Int. Cl.
*H04L 12/28* (2006.01)
(52) U.S. Cl. ......... 370/406; 370/310; 370/351; 370/400
(58) Field of Classification Search .................. 455/447; 370/338, 310, 351, 400, 406
See application file for complete search history.

(56) References Cited

U.S. PATENT DOCUMENTS

| | | | | |
|---|---|---|---|---|
| 3,179,202 A | * | 4/1965 | McL Cole et al. | 181/147 |
| 3,406,342 A | * | 10/1968 | Hubner | 340/503 |
| 4,199,026 A | * | 4/1980 | McCollum | 166/250.15 |
| 4,312,540 A | * | 1/1982 | Thompson | 299/11 |
| 4,777,652 A | * | 10/1988 | Stolarczyk | 455/3.03 |
| 4,972,505 A | * | 11/1990 | Isberg | 455/3.01 |
| 5,606,551 A | * | 2/1997 | Kartalopoulos | 370/406 |
| 5,844,522 A | * | 12/1998 | Sheffer et al. | 342/457 |
| 6,118,998 A | * | 9/2000 | Wismer et al. | 455/427 |
| 6,175,563 B1 | * | 1/2001 | Miloslavsky | 370/352 |
| 6,295,502 B1 | * | 9/2001 | Hancock et al. | 701/201 |
| 6,304,556 B1 | * | 10/2001 | Haas | 370/254 |
| 6,366,584 B1 | * | 4/2002 | Gulliford et al. | 370/403 |
| 6,687,259 B2 | * | 2/2004 | Alapuranen | 370/437 |
| 6,842,674 B2 | * | 1/2005 | Solomon | 701/23 |
| 6,870,816 B1 | * | 3/2005 | Edwards et al. | 370/252 |
| 6,972,677 B2 | * | 12/2005 | Coulthard | 340/531 |

(Continued)

FOREIGN PATENT DOCUMENTS

WO   WO 9836551 A1 * 8/1998

OTHER PUBLICATIONS

Remote Target Monitoring in Embedded Systems Lab Courses using a Sensor Network; Nov. 6-10, 2006; Christian Trodhandl, Markus Proske, and Wilfried Elmenreich; IEEE Industrial Electronics, IECON 2006—32nd Annual Conference on; Paris, France.*

(Continued)

*Primary Examiner* — Kent Chang
*Assistant Examiner* — Ronald Eisner
(74) *Attorney, Agent, or Firm* — Reising Ethington P.C.

(57) ABSTRACT

A network for a mine or other hazardous environment is provided. The network can include a plurality of access points that can communicate with each other. The access points can be deployed along a plurality of pillars in a room-and-pillar mine. The access points can interconnect a mobile wireless client device within the mine with an operations centre. In the event of an explosion or other disaster, a UPS battery back-up and the redundancy of the access points can increase the likelihood that a link between the wireless client device and the operations center can be maintained.

10 Claims, 12 Drawing Sheets

U.S. PATENT DOCUMENTS

| | | | |
|---|---|---|---|
| 7,024,157 B2 * | 4/2006 | Waye et al. | 455/3.05 |
| 7,092,943 B2 * | 8/2006 | Roese et al. | 707/9 |
| 7,275,109 B1 * | 9/2007 | Lee | 709/229 |
| 7,406,320 B1 * | 7/2008 | Kumar et al. | 455/456.1 |
| 7,440,436 B2 * | 10/2008 | Cheng et al. | 370/338 |
| 7,489,932 B2 * | 2/2009 | Chari et al. | 455/447 |
| 2002/0191573 A1 * | 12/2002 | Whitehill et al. | 370/338 |
| 2004/0024896 A1 * | 2/2004 | Stafford et al. | 709/230 |
| 2005/0122927 A1 * | 6/2005 | Wentink | 370/311 |
| 2005/0136845 A1 * | 6/2005 | Masuoka et al. | 455/67.14 |
| 2005/0152305 A1 * | 7/2005 | Ji et al. | 370/328 |
| 2005/0253718 A1 * | 11/2005 | Droms et al. | 340/572.1 |
| 2006/0029010 A1 * | 2/2006 | Belcea | 370/310 |
| 2006/0046642 A1 * | 3/2006 | Bassiri et al. | 455/7 |
| 2006/0167608 A1 * | 7/2006 | Makela et al. | 701/50 |
| 2006/0239216 A1 * | 10/2006 | Chen et al. | 370/310 |
| 2006/0256721 A1 * | 11/2006 | Yarlagadda et al. | 370/235 |
| 2007/0021954 A1 * | 1/2007 | El-Damhougy | 703/21 |
| 2007/0030146 A1 * | 2/2007 | Shepherd | 340/539.1 |
| 2007/0077959 A1 * | 4/2007 | Newman et al. | 455/550.1 |
| 2007/0115895 A1 * | 5/2007 | Ling et al. | 370/338 |
| 2007/0183515 A1 | 8/2007 | Lim et al. | |
| 2008/0002599 A1 * | 1/2008 | Yau et al. | 370/310 |
| 2009/0043439 A1 * | 2/2009 | Barfoot et al. | 701/25 |

OTHER PUBLICATIONS

XNS-X.25 communications gateway; Oct. 23-26, 1988; O'Bryan, J.; Oestereicher, C.; Wright, G.; Communications—What's Possible?'. 1988 IEEE; pp. 1057-1061 vol. 3; San Diego, CA.*

R. A. Isberg, J. C. Cawley and R. L. Chufo, "The Design and Implementation of a VHF Radio System Using Distributed Antennas, Passive Reflectors and Two-Way Signal Boosters in a Room and Pillar Limestone Mine", IEEE 32nd Vehicular Technology Conference Record, May 1982.*

* cited by examiner

NETWORK FOR CONFINED HAZARDOUS OR OTHER EXTREME ENVIRONMENTS

PRIORITY CLAIM

The present application claims priority from U.S. Provisional Patent Application 60/826,456, filed Sep. 21, 2006, the contents of which are incorporated herein by reference.

FIELD OF THE INVENTION

The present invention relates generally to communication networks and more specifically to a network for a confined hazardous environment, such as a mine, a granary, an oil or gas refinery, a sawmill, a furniture factory or like environments.

BACKGROUND OF THE INVENTION

While potentially lucrative, mining can be extremely dangerous exercise. Large underground mines, in particular, present significant safety challenges due to the risk of cave-ins. Coal mines present even greater challenges due to the friable nature of coal and the constant leaking of explosive methane from the coal. It has been hypothesized that communication and locating technology could save miners' lives and mitigate the danger resulting from mine explosions, collapses, gas leaks, etc. Legislation since the disaster mandates communication and location technology so that miners can be located in the event of such disasters, yet such communication and location technology has heretofore been non-existent.

Presently, there are a number of different communications technologies that could be used in mines and similar locations, including: two way radios or "walkie-talkies", wireline networks, "leaky feeder" networks, Personal Emergency Devices or Productivity Enhancement Devices (PEDs), and Through The Earth (TTE) systems. In general, none of the foregoing systems provide a complete range of desirable and satisfactory safety and operational features for a network in a mining or like environment.

SUMMARY OF THE INVENTION

An aspect of the invention provides a network for a mine such as a room-and-pillar or long wall mine. The network comprises a server and a plurality of wireless nodes deployed throughout the mine, typically on pillars. At least one of the nodes communicates with the server. Each of the nodes are configured so that each node is in communication with at least one other of the nodes so that all of the nodes can communicate with the server. The network also includes at least one client configured to execute an application and to communicate with each of the nodes such that the server can communicate with the client.

It can be desired that the nodes be configured to communicate with the server via a first channel and communicate with the client via a second channel It can be desired that the nodes communicate with the client via the 802.11 protocol.

The application can be two-way voice (half duplex or full duplex) over IP telephony and the server can be connected to a voice over IP telephone such that a user at the server can communicate with a miner carrying the client.

The network can be configured to self-heal such that if an explosion results in a loss of one or more of the nodes, the remaining nodes reestablish communication with adjacent nodes to reestablish communication between all of the nodes and the server.

The network can be configured so that if an explosion results in a loss of one or more of the nodes such that not all of the nodes are in communication with the server, then one or more portable nodes can be dynamically configured to automatically communicate with the remainder of the nodes. The portable nodes can be carried into the mine by a search and rescue team and positioned at a location that will reestablish communications between at least some of the inactive nodes all of the nodes and the server. An emergency back-pack can contain a battery-powered node so that rescue workers can be introduced into any section of the network that may be cut-off from the server. This is MANET (mobile ad-hoc network) can be based on equipment provided by Mesh Dynamics.

The client can be carried by a miner and the application can be location determination based on, for example, Relative Signal Strength triangulation between two or more of the nodes such that an application at the server can, in real time, show a representation of a location of the miner.

The application can be two-way video.

The application can be inventory tracking and the client can be an RFID tag that is attached to a piece of mining equipment, such that the equipment can be located in the mine should the equipment be lost under debris.

The application can be a broadcast or targeted announcement where miners can be directed to 'safe rooms' or back-up emergency supplies or equipment.

Nodes are self-addressing so that the network can be easily extended by in-house mine electricians as required, since the mine face, where coal is extracted, can advance up to three-hundred feet per day.

Each node can employ a novel antenna design that accommodates a plurality of radios, presently preferred to be four radios, two of which are dedicated to client communications and two of which are dedicated to backhaul communications. Novel directional antennas to propagate signal efficiently down long corridor spaces to get the most robust 'line-of-sight' signal. In other aspects, novel new bi-directional (directional) antennas so that locating specificity can be enhanced. Bi-directional antennas are preferred where it is desired to achieve longer range propagation than can be achieved with long-range directional antennas. The signal strength of bi-direction antennas need not show much differentiation (decay) along the furthest ⅔ of its pattern, in that the signal strength at, for example, one-thousand feet can look substantially the same as at, for example, thirteen hundred feet) bi-directional antennas can permit propagation of overlapping patterns and therefore provide more reference points for our locating software which calculates Relative Signal Strength of a client among multiple nodes effectively and assisting in location determination.

DETAILED DESCRIPTION OF THE EMBODIMENTS

Figure 1:
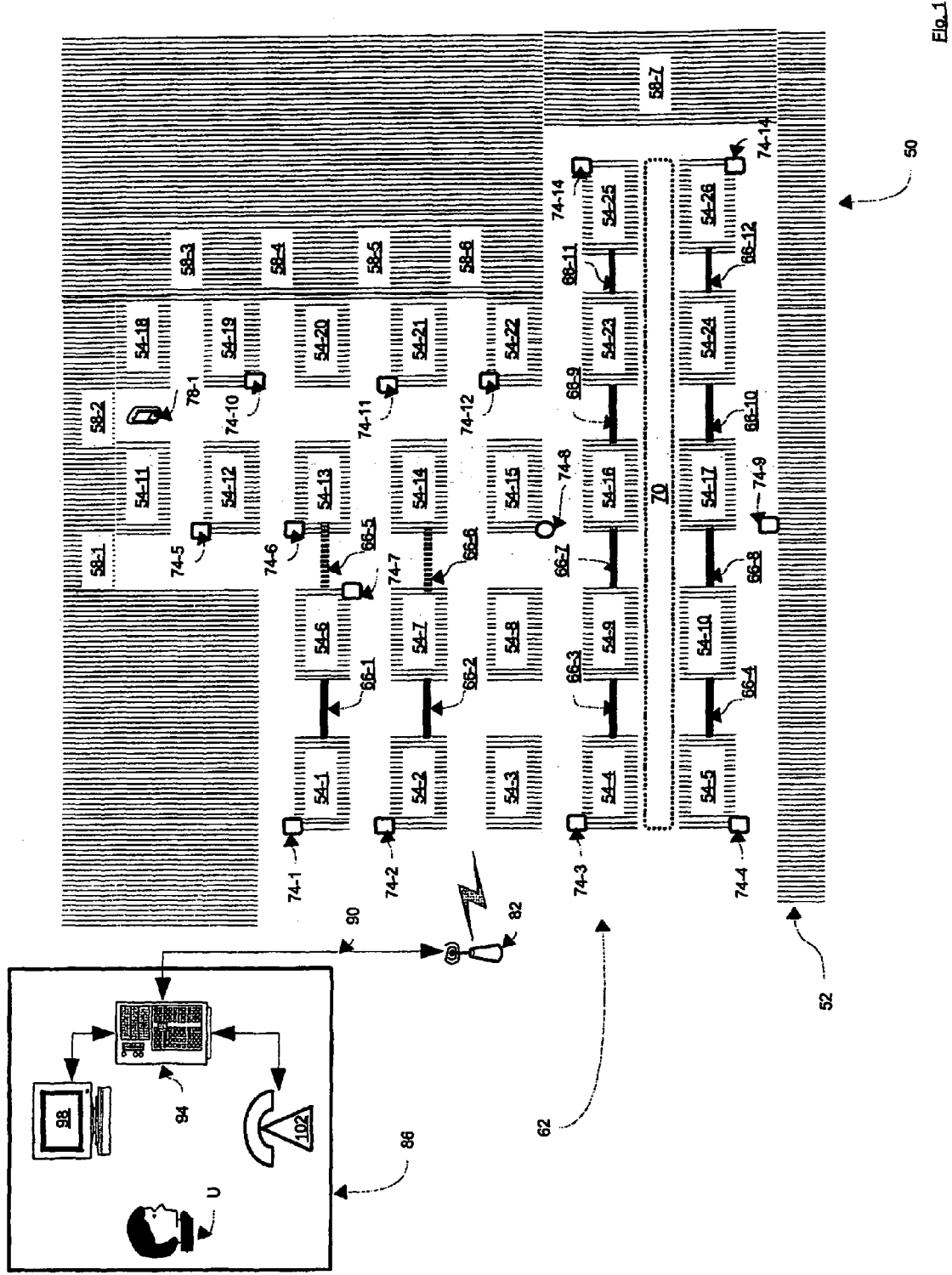
FIG. 1 is a schematic representation of a room and pillar coal mine having a communication system deployed throughout.

Referring now to FIG. 1, a room and pillar coal mine is indicated generally at 50. Mine 50 is characterized by a coal seam 52 that has been mined so as to leave a plurality of pillars 54-1, 54-2 ... 54-26. (Generically, pillar 54, and collectively, pillars 54). The portions of seam 52 that are not pillars 54 but which have yet to be mined are referred to as coal faces and are labeled at 58-1, 58-2, ... 58-7.

Mine 50 is also characterized by a plurality of rooms around each pillar 54. Each room (also known as an "entry" of a "cross-cut") has a width of about twenty feet, and each pillar 54 has a width of about 40-100 feet. Mine 50 can be suitable for long-wall and/or retreat mining whereby each pillar 54 is removed, allowing the roof to collapse, and further adding to the risk of harm for mining personnel.

Mine 50 is also characterized by an entrance 62 where miners, other personnel and equipment can enter and exit mine 50 and through which coal extracted from mine 50 can be removed.

Mine 50 is also characterized by a plurality of barriers 66-1, 66-2, 66-12 which can be used to isolate certain rooms from each other. Barriers 66 can be arranged so as to isolate corridors of rooms. For example, barriers 66-3, 66-7, 66-9 and 66-11 define one side of a corridor 70 while barriers 66-4, 66-8, 66-10 and 66-12 define the opposite side of corridor 70. Corridor 70 can, for example, be reserved for a conveyor belt that brings coal from face 587-7 to entrance 62. Likewise, ventilation equipment in mine 50 can be configured so as to direct dirty air flow out of entrance 62 and thereby urge clean air into the remainder of mine 50.

Barriers 66 can either be fixed stoppings, or can also be so-called "man-doors" that permit personnel to open and pass through those doors if desired. In mine 50, barriers 66-5 and barriers 66-6 are man doors, whereas the remaining barriers 66 are all stoppings.

In an accordance with an embodiment, a communication network 72 is also deployed throughout mine 50. Communication network 72 is shown schematically in FIG. 2, while the components of network 72 are shown in both FIGS. 1 and 2. Network 72 comprises a plurality of access points 74 mounted to various points throughout mine 50, principally to pillars 54. Network 72 also comprises at least one client device 78-1 that is configured to wirelessly communicate with those access points 74 that are within range of device 78-1.

System 50 also includes at least one base station 82 which is configured to wirelessly communicate with those access points 74 within range of base station 82. Base station 82, in turn, is connected to an operations centre 86 via a link 90, which can be wired or wireless as desired. Base station 82 can be implemented as an access point 74 that connects to operations centre 86.

Operations centre 86 houses a server 94 that connects to base station 82 via link 90. Server 94, in turn, is configured to permit a user U to interact with system 50 via a terminal 98 and a telephony device 102. Terminal 98 permits user U to provide text based input and to view visual output from server 94, while telephony device 102 permits user U to conduct voice telephone calls via server 94. Those skilled in the art will recognize that various configurations and types of input and output devices can be utilized, in addition to, or in lieu of telephony device 102 and terminal 98.

Figure 2:
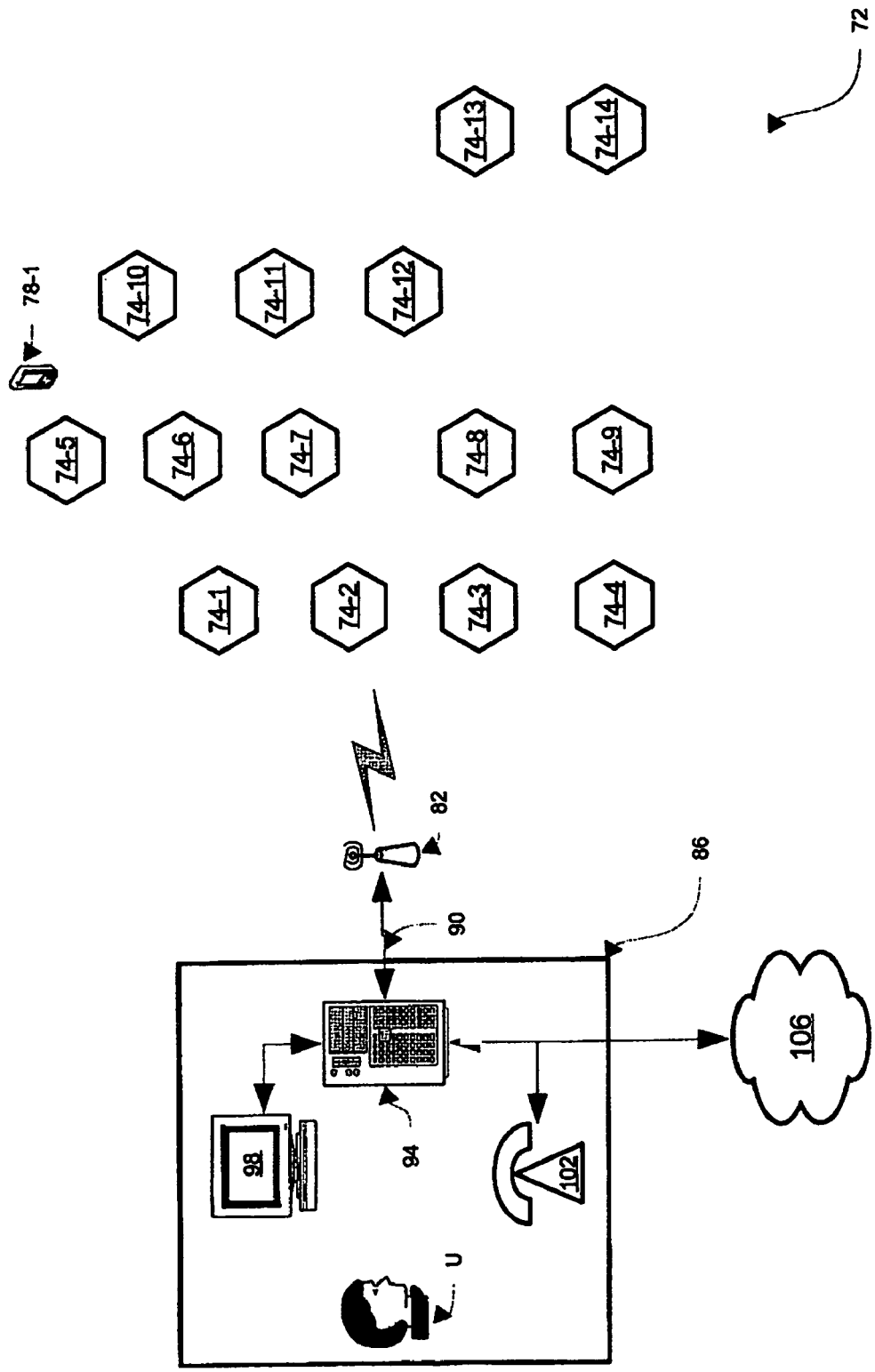
FIG. 2 is a schematic representation of the communication network deployed in the mine of FIG. 1.

As shown in FIG. 2, server 94 is also connected to a network 106, such as the Internet, to permit users who are remote to server 94 to interact with server 94 in the same manner as user U.

Figure 3:
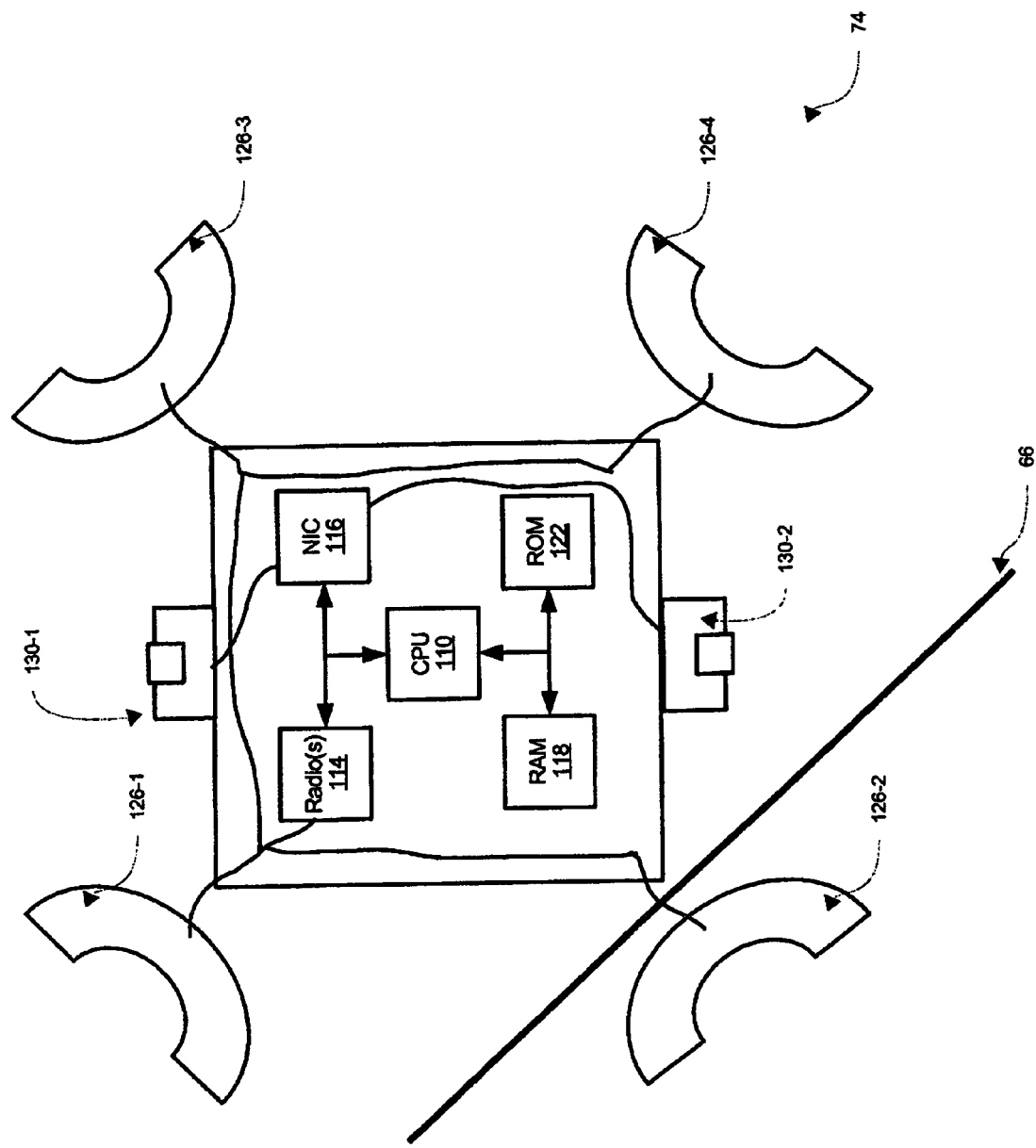
FIG. 3 is a schematic representation of an access point used in the system of FIG. 2.

Referring now to FIG. 3, an access point 74 is shown in greater detail. Access point 74 includes a plurality of internal components including central processing unit ("CPU") 110 that interconnects, via a bus, to a radio 114, a network interface card ("NIC") 116, random access memory ("RAM") 118 (or other volatile storage device), and a read only memory ("ROM") 122 (or other non-volatile storage device). Not shown in FIG. 3, access point 74 also houses a rechargeable power supply. In a normal condition, access point 74 is connected to the electrical service main running within mine 50. However, in an emergency condition access point 74 is configured to continue operating by virtue of the rechargeable power supply, which is being constantly maintained at full charge by virtue of connection to the electrical service main.

The internal components of access point 74 are housed within a ruggedized, spark-proof housing which meets mining regulations so that the power supply within access point 74 has a reduced risk of igniting flammable gases that may be present within mine 50. Such ruggedization is referred to as making the access point 74 "intrinsically safe" as specified by MHSA and/or other regulatory agency and/or body.

Each access point 74 also has a battery that is configured to permit the access point 74 to operate for up to four days. Each access point 74 is connected to a step down transformer to provide one-hundred-and-twenty volts AC and/or twenty-four volt DC as desired. The twenty-four volt DC version is presently preferred as it is, in general, more efficient and easier to make intrinsically safe. Either lead acid or lithium ion battery technology is presently preferred, taking into tradeoff considerations between weight and price of each. However, it is noted that lithium-ion batteries are easier to make intrinsically safe.

In a present embodiment, access point 74 also comprises a plurality of directional antennas 126-1, 126-2, 126-3, 126-4. Accordingly, it is presently preferred to include a plurality of radios within radio 114, one radio to control each antenna. Furthermore, it is also presently preferred that each antenna 126 be configured to communicate on two different channels—one channel for upstream communications to other access points 74 towards the coal faces of mine 50, and another channel for downstream communications to other access points and towards the operations center 86. Each directional antenna 126 is controlled by radio 114, and each antenna 126 is configured to both receive and transmit wireless communications and thereby permit each access point 74 to communicate with each other and/or base station 82 provided they are in range of each other.

In a present embodiment, access point 74 also comprises a plurality of wired interface connections 130-1, 130-2. Each interface port 130 is controlled by NIC 116, and each port 130 is configured to interact with peripheral devices that are locally attached to port 130. In a present embodiment, each interface port 130 is based on the Ethernet standard, but in other embodiments interface connections 130 can be based on universal serial bus ("USB"), RS-232, Firewire and the like and/or combinations thereof. Peripheral devices that are contemplated for connection to access point 74 include substantially permanent connections such as video cameras, gas sensors, temperature sensors, humidity sensors, or other sensors, loud speakers and/or temporary connections including lap top computers, personal digital assistants, printers, bar code scanners, and/or device 78 itself in the event that device 78 becomes unable to communicate wirelessly with access point 74.

ROM 122 thus maintains a persistent copy of software and other programming instructions to operate access point 74 that implement the various communication and other functions for which access point 74 is configured. It is also contemplated that the contents of ROM 122 can be updated, either via an antenna 126 or port 130.

Also of note, in a present embodiment each antenna 126 is mechanically separate from the main chassis of access point 74, and attachable electrically via an intrinsically safe cable and its associated connectors to the main chassis. Each antenna 126 can thus be mounted to a pillar 54 or other suitable location within mine 50 and oriented in a direction so as to create and/or be within a coverage area of another antenna 126 on another access point 74. The detachable nature of each antenna 126 also permits an antenna 126 to be located on one side of a barrier 66, while the chassis of the access point 74 is located on the opposite side of the barrier 66. This is shown in FIG. 3, as antenna 126-2 is located on one side of a barrier 66, while the chassis of access point 74 is located on the opposite side of a barrier 66. Since, in general, barriers 66 are not air-tight, and cable can be readily run through gaps or drilled openings within barrier 66.

Because, in a present embodiment, each access point 74 can support up to four radios, and antennas 126 are bi-directional, each access point 74 can propagate up to eight signal patterns via remotely deployed antennas 126, which in a present embodiment can be deployed up to about forty feet away from its respective access point 74 via cable. One access point 74 can therefore be used to generate bi-directional signal for two entries, which can provide significant cost-savings and/or efficient use of hardware by enabling fewer access points 74 to be deployed in mine 50 than would be required with prior art access points.

Figure 4:
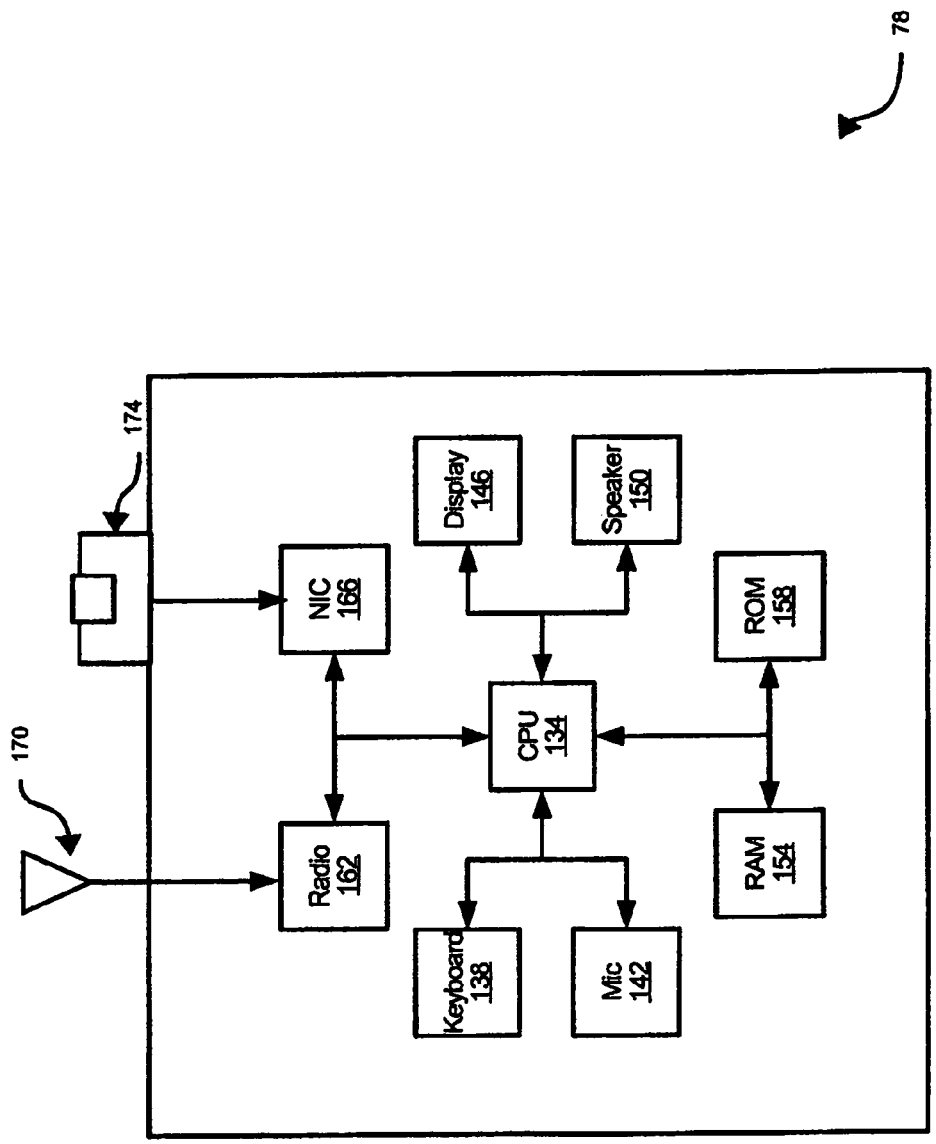
FIG. 4 is a schematic representation of a client device used in the system of FIG. 2.

Referring now to FIG. 4, client device 78 is shown in greater detail. With some significant modifications, client device 78 can be based on the functionality of a wireless personal digital assistant such as IPaq™ from Hewlett Packard, TREO™, from Palm Inc., or Blackberry™, from Research in Motion Inc. Device 78 is also presented in a ruggedized, intrinsically safe, spark-proof casing to withstand the physical demands of a mining environment while also reducing the likelihood of electrical components within device 78 igniting gases within mine 50. The internal components of device 78 thus include a CPU 134 which interconnects a keyboard 138 and a microphone 142 (and/or other input devices) with a display 146 and a speaker 150 (and/or other output devices). CPU 134 also interconnects the foregoing components with RAM 154, ROM 158, a radio 162 and an NIC 166. Radio 162, in turn, connects to an antenna 170, while NIC 166 connects to an interface port 174. Radio 162 and antenna 170 are configured to communicate wirelessly with each access point 74 that is within range of device 78. NIC 166 and interface port 174 can be based on USB, Firewire, RS-232, RS-485, or wireless media including Bluetooth™ or ZigBee. Multiple NICs can be included that communicate using different ones of the aforementioned protocols. It should be understood that in variations, device 78 need not include all of the features discussed above.

In a presently preferred embodiment client device 78 is a Windows™-based 'Personal Digital Assistant' which includes software that configures device 78 for communication and locating device 78. Device 78 can communicate with each access point using the IEEE 802.11b,g (or its variants) standard. Software permits each client device 78 to function as a walkie-talkie and/or a VoIP telephone. Locating software allows the user to see exactly where the user is located within mine 50, and to see the location of other client devices 78 in his vicinity. Other tools built in such as messaging and spreadsheets can be included as desired.

Figure 5:
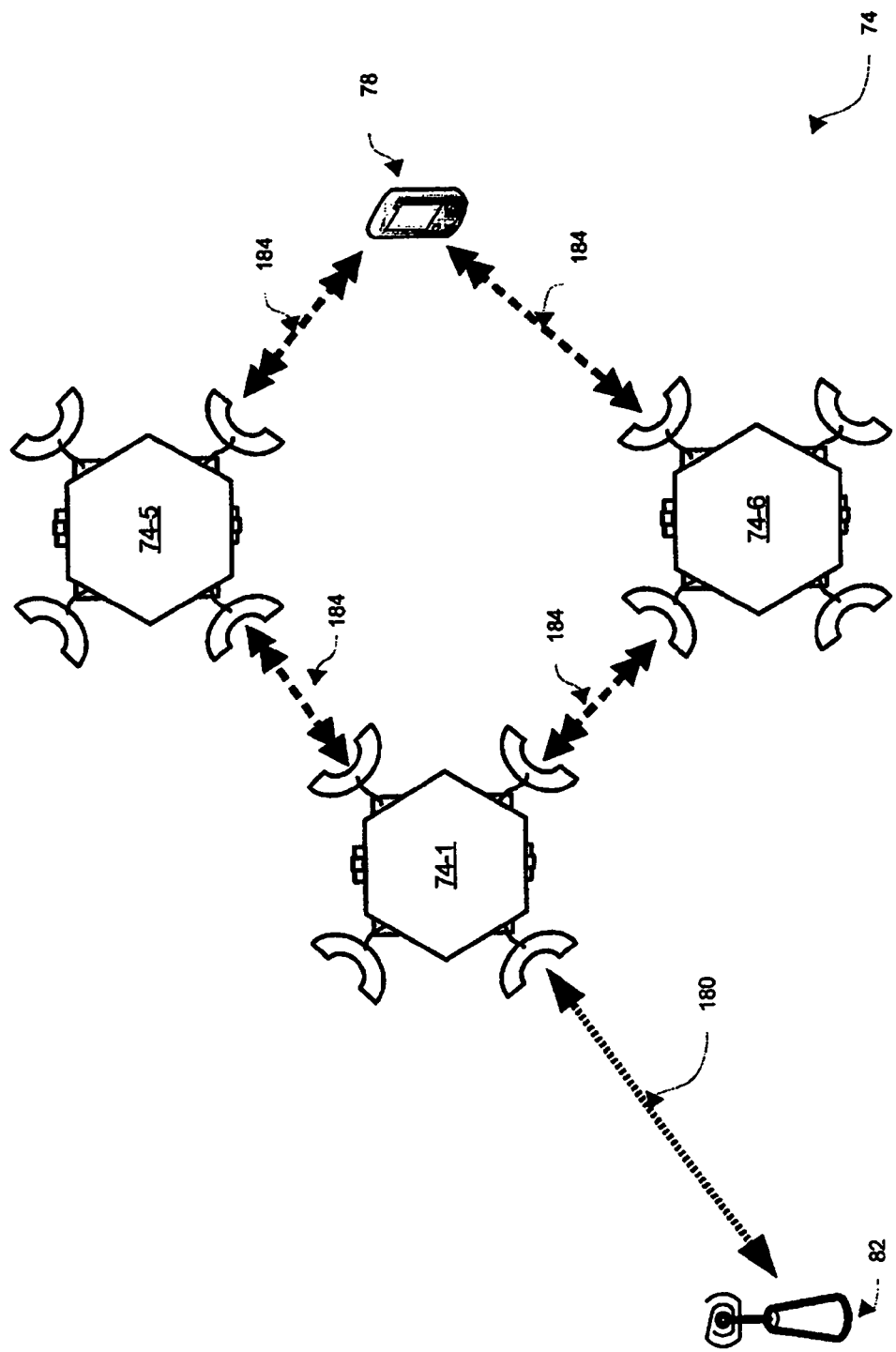
FIG. 5 is a schematic representation of a portion of the network shown in FIG. 2.

Referring now to FIG. 5, an example configuration of base station 82, access points 74 and device 78 is shown, whereby communications between device 78 and base station 82 is effected via access points 78. As discussed earlier, each access point 78 is configured to communicate over two channels, and each antenna 126 is dynamically configurable to operate over either channel. Likewise, each antenna 126 can be physically mounted in a direction to create a coverage region that overlaps with another antenna 126 on another access point 74. In FIG. 5, access point 74-1 is shown as bi-directionally communicating with base station 82 via a first, downstream channel 180. Access 74-1 is also shown bi-directionally communicating with access point 74-5 and access point 74-6 via a second, up-stream channel 184. In turn, access point 74-5 and access point 74-6 are also shown bi-directionally communicating with access point 78 via upstream channel 184.

Downstream channel 180 and upstream channel 184 are orthogonal to each other and therefore non-interfering. In a presently preferred embodiment, downstream channel 180 is carried at a frequency of 2.4 Gigahertz while upstream channel 184 is carried at a frequency of 5.8 Gigahertz and based on the IEEE 802.11b (and/or its variants) protocol.

Figure 6:
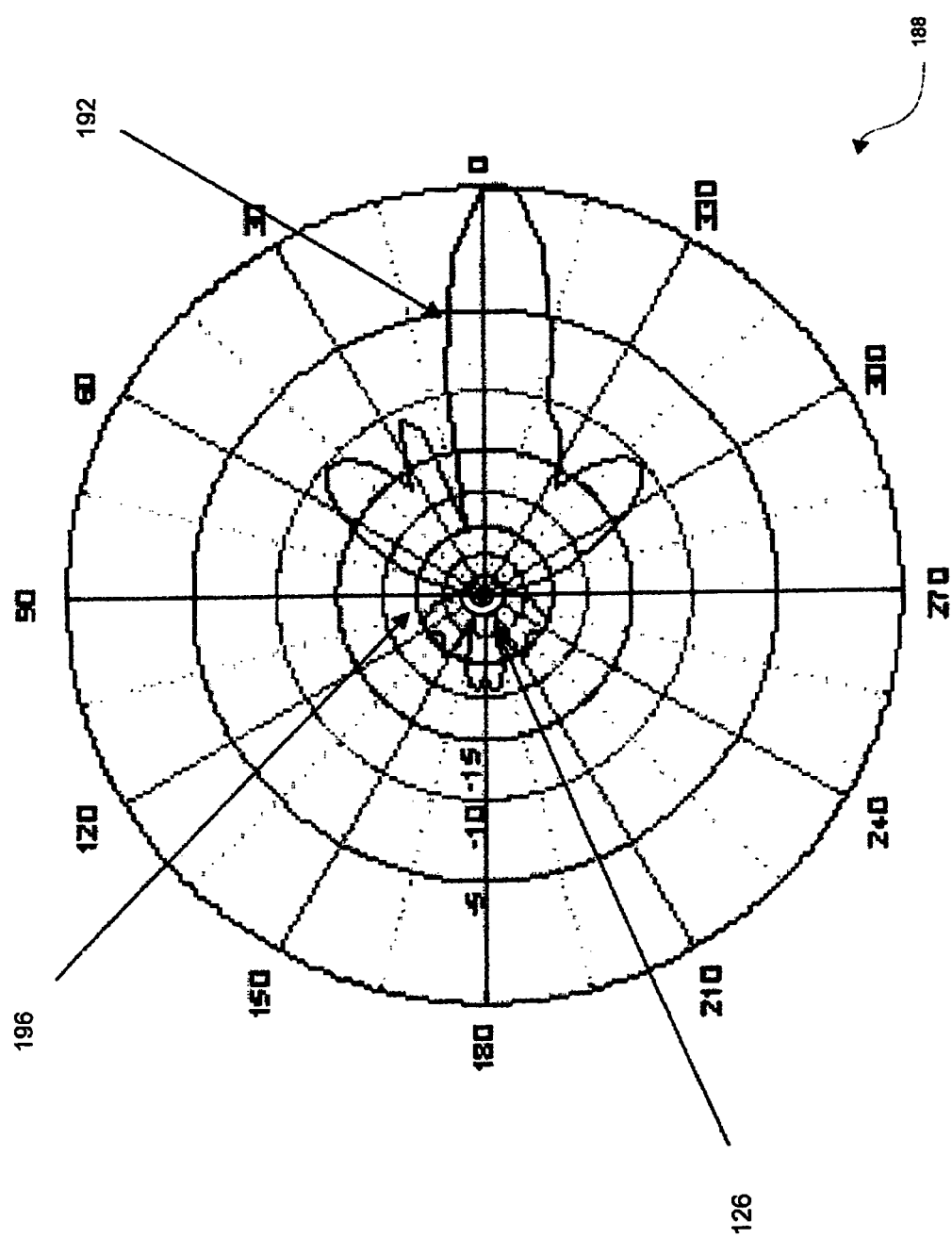
FIG. 6 shows a range of coverage for an antenna for the access point of FIG. 3.
Figure 7:
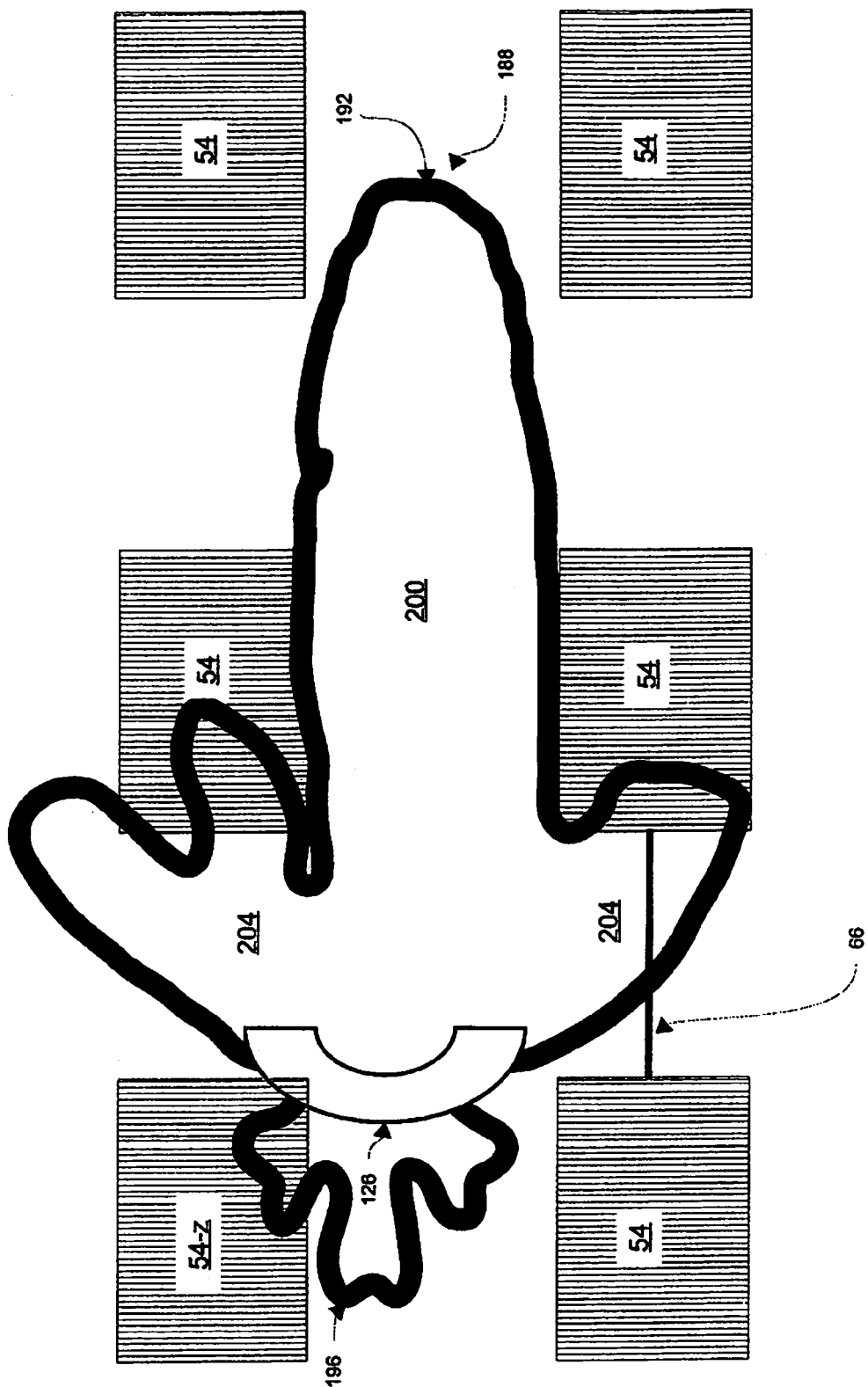
FIG. 7 shows the coverage range of FIG. 6 in context with a plurality of pillars.

Referring now to FIGS. 6 and 7, a graph showing the range of coverage for each antenna 126 is indicated generally at 188. Such range of coverage is typically bi-directional. Channels 180 and 184 can each have substantially the same range of coverage as according to the graph in FIGS. 6 and 7. Each antenna 126 is configured, in conjunction with radio(s) 144, to generate a forward coverage footprint 192 according to the shape shown in FIGS. 6 and 7, and a rear coverage footprint 196 also according to the shape shown in FIGS. 6 and 7. As best seen in FIG. 7, where antenna 126 is mounted to pillar 54-z, the central portion 200 of forward footprint 192 is configured to cover the width of one or more rooms that are defined between adjacent pairs of pillars 54. The side portions 204 of forward foot print 192 are configured to cover the cross cuts that are adjacent to the rooms. Side portions 204 are also configured to have some penetration through any barriers 66 located within those cross cuts. Rear portion 196 is advantageously configured to provide additional coverage in the event of an explosion that causes a loss of other antennae 126 and/or access points 64.

Figure 8:
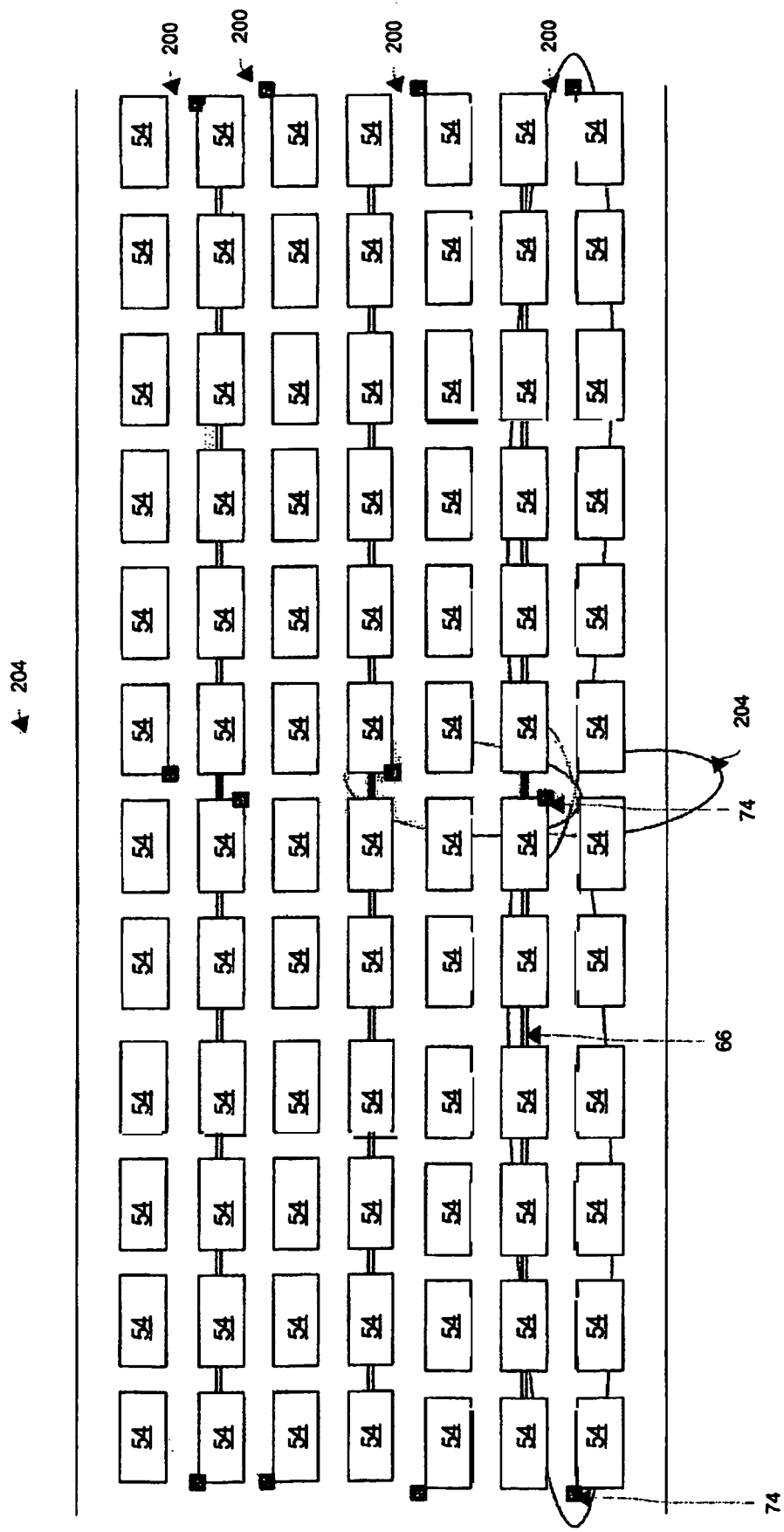
FIG. 8 shows the ranges of coverage for a plurality of antennae in an idealized grid of pillars.

FIG. 8 shows the ranges of coverage for a plurality of antennae 126 in an idealized grid of pillars 54. The length of the idealized grid of pillars 54 can be about three thousand feet. Of particular note is that various antennae 126 from access points 74 are positioned so that the forward footprint 200 will primarily cover the rooms between adjacent pillars 54, but also to provide some additional coverage along the cross cuts and through barriers 66. Likewise, the side portions 204 provide substantial coverage between cross cuts and therefore access points 74 on opposite sides of a barrier 66 are able to communicate with each other.

Figure 9:
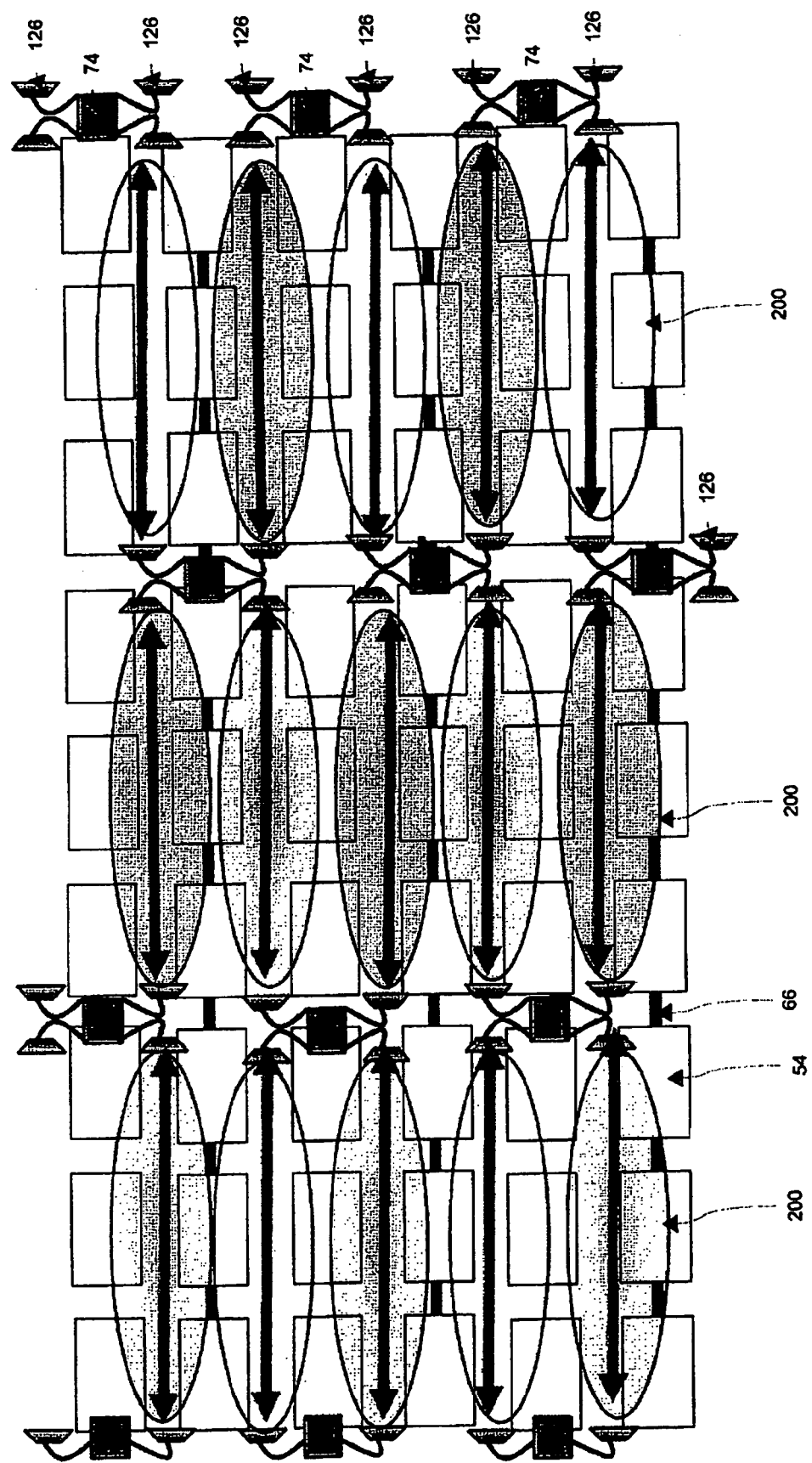
FIG. 9 shows an idealized grid of pillars and access points and the communication interactions therebetween.

FIG. 9 shows another idealized grid of pillars 54 as well as a plurality of forward footprints 200 that are substantially covering the rooms between pluralities of adjacent pillars. As part of the inventive bi-directional antennas, which also provide additional reference points for locating, the deployment configuration of access points 74 can be established so as to stagger each access point 74 so that the distance interval therebetween is about seven-hundred-and-fifty feet.

Figure 10:
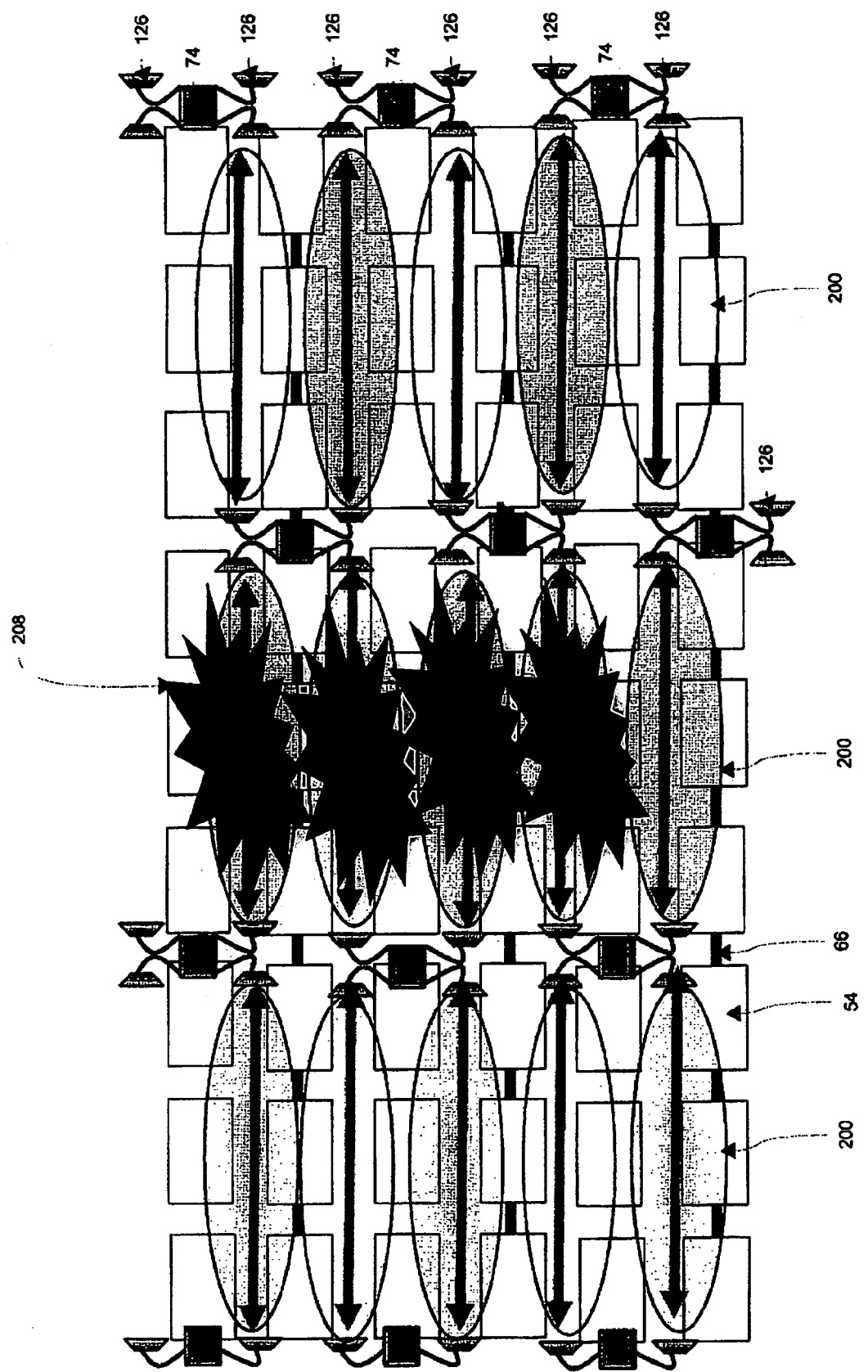
FIG. 10 shows the grid of FIG. 9 where an explosion has disabled certain access points.

FIG. 10 shows the grid of pillars in FIG. 9, but wherein an explosion 208 has disabled a number of antennae 126 and/or access points 74, leaving only a small portion of the length of the grid of pillars 54 unblocked. Despite explosion 208, communication between various access points 74 is still possible. Accordingly, a client device 78 will still be able to communication with operations centre 86.

Figure 11:
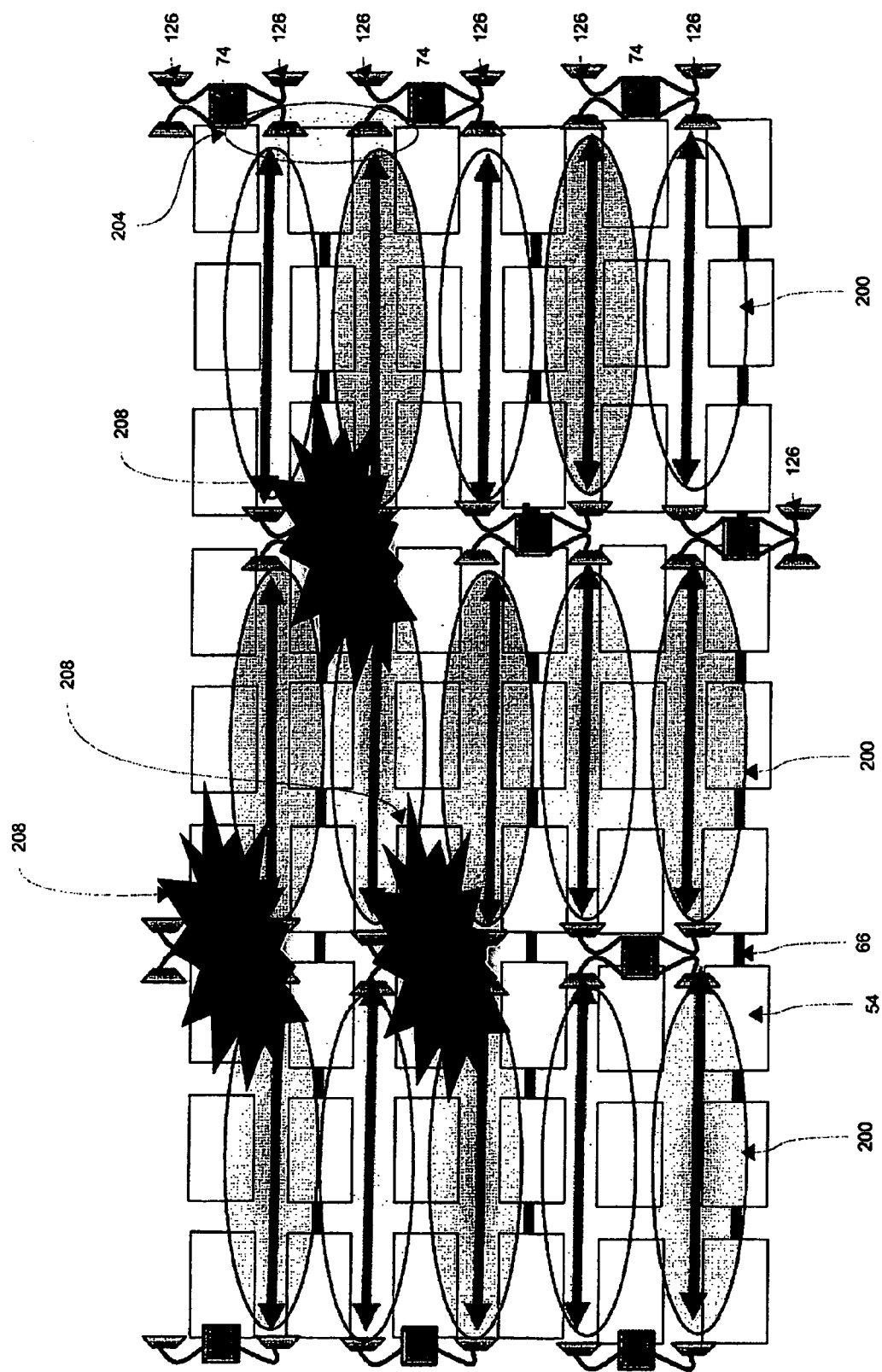
FIG. 11 shows the grid of FIG. 9 with an explosion having disabled certain other access points.

FIG. 11 shows the grid of pillars of FIG. 9 but where several explosions have disabled a number of access points 74 at different locations throughout the grid of pillars 54. In FIG. 11, side portions of footprint 192 still allow adjacent access points 74 to remain in communication with each other, such that access points 74 at either end of the grid of pillars 54 are still able to communicate with each other.

It is also presently preferred that the function of radio(s) 144 for each antenna 126 be dynamically configurable so that the frequency and/or communication protocols that are transmitted from each antenna 126 can be dynamically adjusted, either through automatic selection by each access point 74 and/or via control from operations centre 86. Thus, one particular radio/antenna 126 combination could be used for an upstream channel 180 and/or a downstream channel 184. It can be desired to configure for fewer or additional channels. For example, in the event of an explosion resulting in loss of access points 74, it can be desired to cause each access point 74 to simply default their operation to one channel that only carries a VoIP application, and thereby increase the likelihood that a client device 78 can successfully be used by lost or trapped personnel to communication with operations centre 86. However, where a number of access points 74 are all active, and overlapping in coverage, then those access points 74 can be configured to automatically, or manually, operate over a plurality of orthogonal channels and thereby dedicate certain channels to certain applications e.g. one channel for voice, another for data, and another for backhaul back to operations centre 86, and thereby be able to tailor each channel according to the quality of service that is desirable for a particular channel and for a particular application, but all based on the overall number of access points 74 that are able to communicate with each other at a given time.

Deployment of new access points 74 can be performed substantially in conjunction with the formation of each new pillar 54. Furthermore, in the event of complete severance of one set of access points 74 from another, then a mobile access point 74 can be carried into mine 50 by a rescue worker to a location that serves as a bridge between the severed portions and thereby reestablish complete connection of all access points 74 to each other and to operations centre 86.

Figure 12:
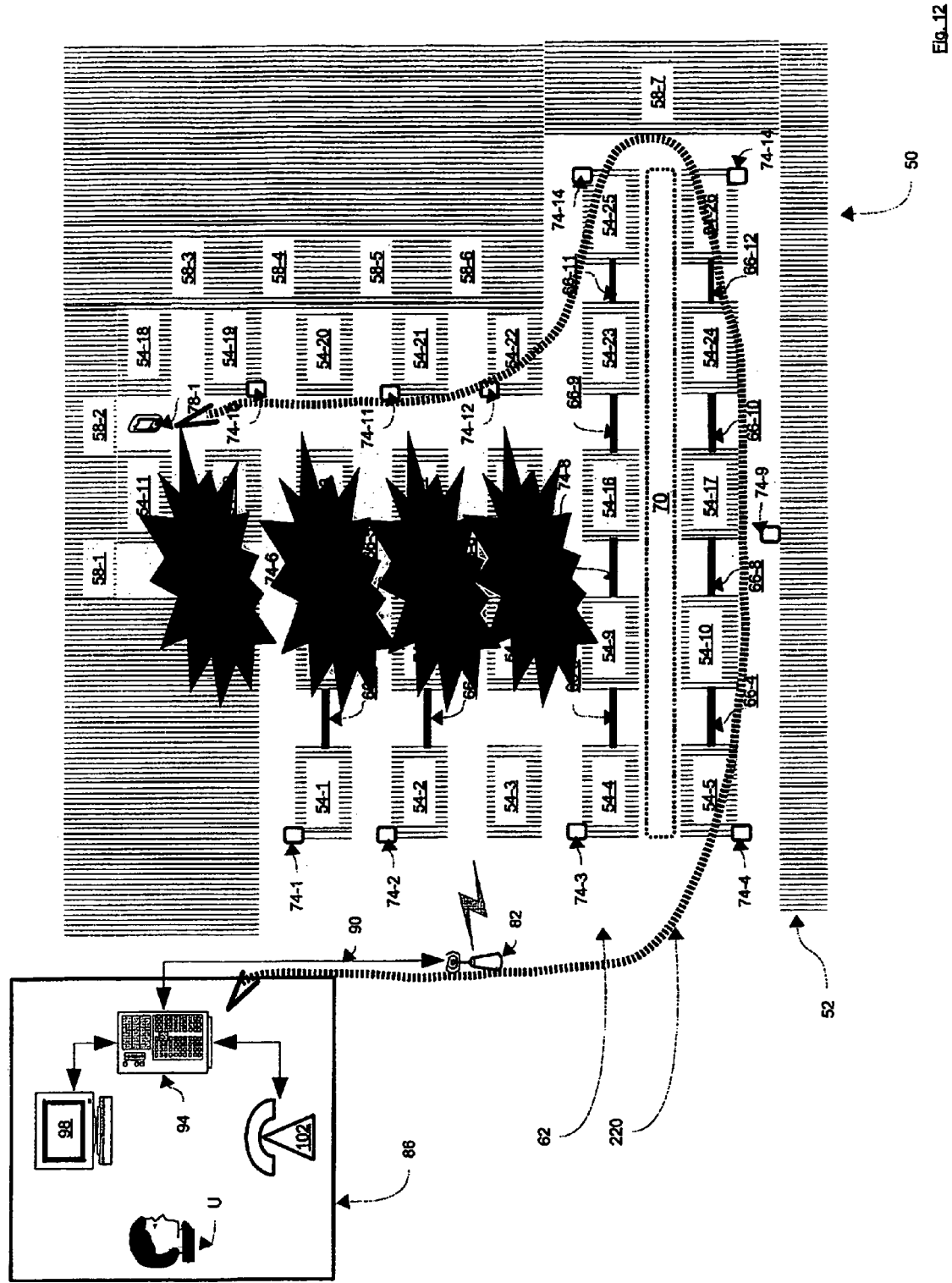
FIG. 12 shows the mine of FIG. 1 where an explosion has disabled various access points.

FIG. 12 shows the mine of FIG. 1 but with an explosion that has caused a complete collapse of the mine in the vicinities of pillars 54-6, 54-7, 54-8, effectively trapping a miner or other personnel located at coal face 58-3. Since those personnel are carrying device 78-1, communication with operations centre 86, either via voice or text or even video, is permitted via the pathway indicated at 220, which could be as long as about ten miles. Those skilled in the art will recognize that after such an explosion, the entire interior of mine 50 can be cast into darkness, with soot and dust limiting visibility even with the use of lights. Using mapping information at server 64, a user U could potentially instruct the personnel at coal face 58-3 how to simply walk out of mine 50, by simply walking along the pathway indicated at 220. Even if explosions have blocked a path, personnel at coal face 58-3 can at least communicate with user U and even be permitted to communicate with loved ones via network 106 while they await rescue from the mine 50.

The foregoing provides certain exemplary embodiments, but such embodiments are not intended to be limiting. Other variations, combinations and/or subsets of those embodiments are contemplated. The scope of the invention is defined solely by the claims attached hereto.

The invention claimed is:

1. A network for an underground mine, said mine comprising rooms having pillars that define a forward extent and a lateral extent of each room, said network comprising:
   a server;
   a plurality of wireless nodes deployed on said pillars, each of said wireless nodes having at least one directional antenna, said at least one directional antenna configured to generate a coverage footprint directed along at least a portion of said forward extent and additionally directed along at least a portion of said lateral extent; at least one of said nodes in communication with said server; each of said nodes configured so that each node is in communication with at least one other of said nodes so that all of said nodes can communicate with said server; and,
   at least one client configured to execute an application and to communicate with each of said nodes such that said server can communicate with said client.

2. The network of claim 1 wherein said nodes communicate with said server via a first channel and communicate with said client via a second channel.

3. The network of claim 1 wherein said nodes communicate with said client via the 802.11 protocol.

4. The network of claim 1 wherein said application is voice over IP telephony and said server is connected to a voice over IP telephone such that a user at said server can communicate with a miner carrying said client.

5. The network of claim 4 wherein said server is also connected to the public switched telephone network such that said miner can communicate with telephony devices on said public switched telephone network.

6. The network of claim 1 wherein said network is configured to self-heal such that if an explosion results in a loss of one or more of said nodes remaining of said nodes reestablish communication with adjacent nodes to reestablish communication between said remaining of said nodes and said server.

7. The network of claim 1 wherein if an explosion results in a loss of one or more of said nodes such that not all of said nodes are in communication with said server, then one or more portable nodes configured to automatically communicate with the remainder of said nodes can be carried into said mine by a search and rescue team and positioned at a location that will allow said one or more portable nodes to reestablish communications between remaining of said nodes and said server.

8. The network of claim 1 wherein said client is carried by a miner and said application is location determination based on triangulation between two or more of said nodes such that an application at said server can, in real time, show a representation of a location of said miner.

9. The network of claim 1 wherein said application is two way video.

10. The network of claim 1 wherein said application is inventory tracking and said client is an RFID tag that is attached to a piece of mining equipment, or safety room or self-rescue/breathing equipment such that said client can be located in said mine.

* * * * *